United States Patent [19]

Dalupan

[11] 4,350,568

[45] Sep. 21, 1982

[54] HIGH EFFICIENCY WATER DISTILLATION APPARATUS

[76] Inventor: Romulo V. Dalupan, No. 1351 Bayswater Cresc., Windsor, Ontario, Canada

[21] Appl. No.: 254,305

[22] Filed: Apr. 15, 1981

[51] Int. Cl.³ .............................................. B01D 3/02
[52] U.S. Cl. ................................ 202/180; 202/185 E; 202/267 R
[58] Field of Search ............... 202/163, 165, 166, 167, 202/177, 180, 181, 185 E, 186, 187, 189, 190, 193, 196, 206, 232–235, 237, 267

[56] References Cited

U.S. PATENT DOCUMENTS

| | | | |
|---|---|---|---|
| 2,383,294 | 8/1945 | De Stefano | 202/180 |
| 2,475,482 | 7/1949 | Clemens | 202/180 |
| 3,011,956 | 12/1961 | Smith et al. | 202/187 |

Primary Examiner—Frank Sever
Attorney, Agent, or Firm—Charles Krassov

[57] ABSTRACT

This invention is an apparatus for water purification by distillation. It consists of an upper compartment which is its primary condenser, and a lower compartment which stores the unpurified cold and partly heated water and a heating unit which changes this water into steam. The primary condenser converts the steam into distilled water by means of a number of spiral coolant tubes; and any water vapor or steam which escaped the condensing action in the primary condenser is carried to a secondary condenser in which the condensation is completed. The invention is also provided with means for returning overflow boiling water, and partly heated coolant water from the cooling coils, back to the lower compartment water supply, to be boiled again.

3 Claims, 1 Drawing Figure

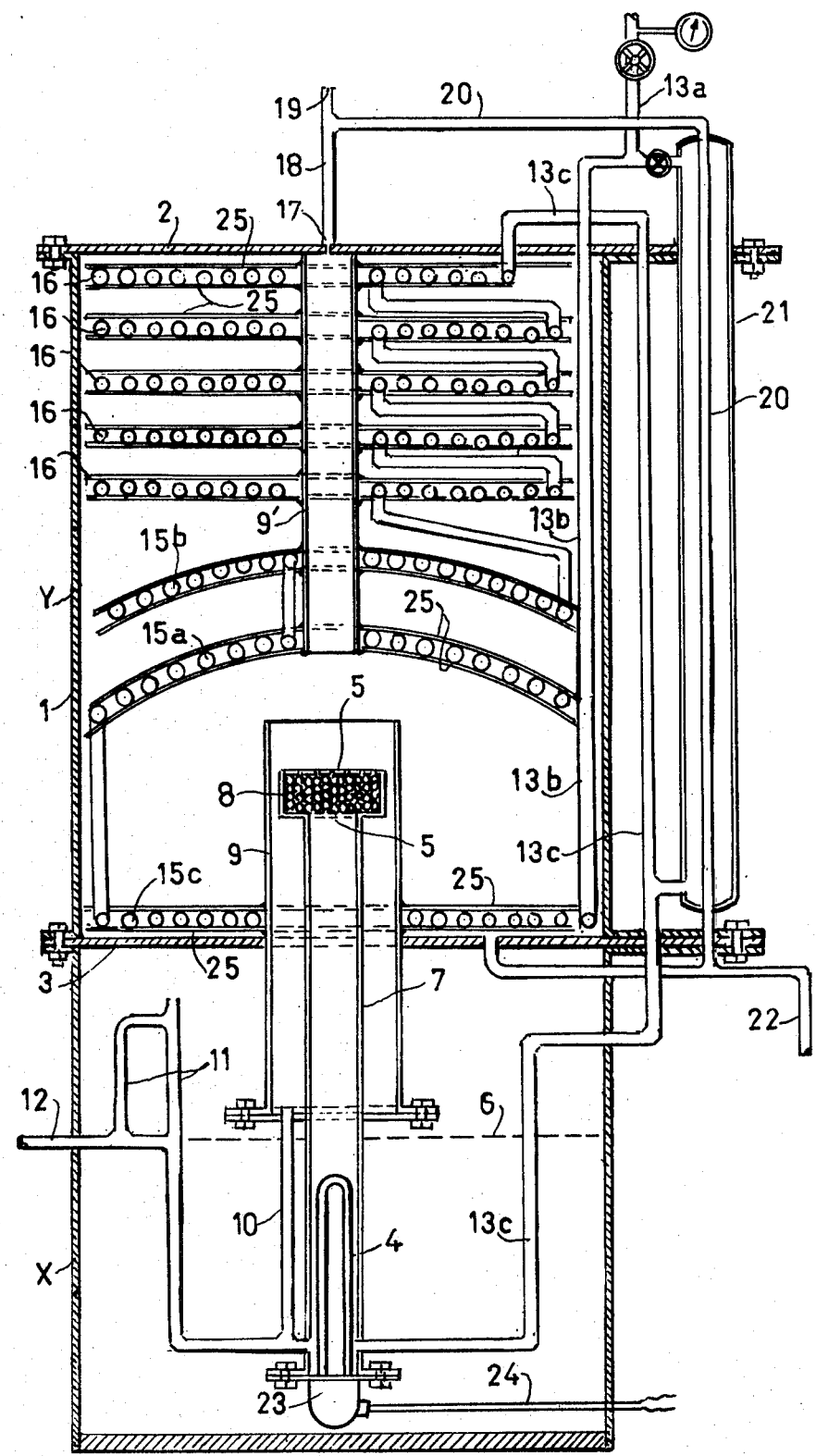

HIGH EFFICIENCY WATER DISTILLATION APPARATUS

This invention consists generally of a still, and particularly of a still in which water is purified by distillation at a very low energy cost.

Distilled water has been used in a large variety of industries where the natural water contaminants, such as minerals, bacteria, industrial and animal waste, insect spray, etc., interfered with the production and the purity of the manufactured products.

At the present time there is considerable research being done in the fields of medicine and biology, to determine the amount of damage impure drinking water may do to the human body by way of disease or the harmful accumulation of some of the commonly found minerals in drinking water, such as various calcium salts, which are suspected of causing gallstones, kidney stones, arthritis, and several other diseases. Because of the wide publicity of such research, the public is turning towards the use of distilled water for drinking and food preparation purposes.

The distillation of water is a comparatively simple process. It consists of boiling the water, thus coverting it to a vapor or steam, and condensing or cooling the steam back to water. Since the contaminants are usually solids, or liquids having a much higher boiling point than the water, the contaminants are left in the residue, and are discarded. Many types of bacteria are destroyed by the boiling. It can, therefore be seen that the cost of the energy used in the distillation process depends upon the heat consumed during the boiling of the water, and the quantity and temperature of the coolant used in the condensation of the steam. The increased demand of distilled water for domestic and consumption uses, added to the industrial use, has considerably increased the amount of energy used for that purpose of water distillation, making it an important factor in the conservation of energy.

It is therefore, the primary object of this invention to provide distilling apparatus which reduces the heat required in the boiling of the water, and which reduces to a great degree the waste of coolant used for the condensation of the steam.

Another object of the invention is to provide a water distilling apparatus which can be reduced in size for domestic use, or increased to a large enough size for industrial use to provide in each case high efficiency distillation, with a minimum of change in its basic design.

This is accomplished in the invention by utilizing the coolant water, the temperature of which has been raised by its contact with the steam in the condenser, to provide preheated water to the boiling part of the apparatus; thus requiring less heat to bring the water to a boil. By using the coolant entirely or in part, as a source of the water to be boiled, the quantity of wasted coolant has been greatly reduced.

In describing the invention reference will be made to the attached drawings which is a schematic diagram showing the components of the invention, other than the piping, in section.

The piping shown in the drawing, indicates the flow of cold water, hot water, steam and gases, and the condensed distilled water.

To maintain the purity of the distilled water, and to insure a long life to the still, all the components are built of 95% stainless steel. The shell 1 which may be built in various shapes, is preferred to be cylindrical, to generally conform with its interior components which are spiral or circular in shape.

The shell 1 is built in two combined but separate sections "X" and "Y". The bottom section "X" houses most of the water boiling components, while the top section is mainly the primary condenser. The said two sections are separated from each other by a plate 3, and the top chamber "Y" is covered by a plate 2. The sections are bolted together by means of flanges provided for that purpose. The plate 3 is held between these flanges which may also contain suitable gasket material, where required. Similarly, the top 2 is attached to the upper flange of the chamber "Y".

The water boiling mechanism, which is located mostly in the bottom chamber "X" consists of a tube 7, within the enclosed bottom of which is located an electrical heating unit 4, which is temperature controlled by a thermostat 23, which is connected to the power system by wires or cables 24. The open top of the tube 7 terminates in an expanded area containing therein several layers of small glass balls or marbles 8, which are held therein by perforated top and bottom plates 5. Starting a short distance above the heating unit 4, the tube 7 is enclosed by a spaced, larger tube 9, which extends a short distance above the top of the contained tube 7. The tube 7 delivers the steam from the boiling waters, into the primary condenser area; and the tube 9 catches the overflow of hot water from said tube, if any, and sends it back to the heating unit 4, through the pipe 10.

The upper chamber "Y", being the primary condensing stage, is equipped therein with several parallel, spaced, spiral layers of steam or vapor cooling tubes 16, which are connected to each other, and inter-connected with a pair of spaced dome-shaped, spiral, vapor cooling tubes 15a, 15b, and a spiral of cooling tubes 15c located slightly above the plate 3.

The cold water which is to be distilled, enters the still through a valve and pressure controlled pipe 13a which is directly connected to the available water system, or to a company's own water supply source. This pipe divides into two branches, one of which goes directly into the secondary condenser 21, where it acts as a coolant; while the other branch 13b supplies cold water to the spiral condenser tubes 15c, 15a, 15b, and 16, in that order. The discharge of the coolant water from the spiral condenser tubes leaves the top spiral coil through the pipes 13c and goes directly into the bottom of the boiling chamber 7. Since the water in the spiral tubes has been heated to a certain degree by the steam that they were condensing, the water entering the boiling chamber 7, will not require as much heat to convert it to steam, as it would require if the water came directly from the cold water source.

The warmed up coolant water from the secondary condenser 21 combines with the above mentioned coolant water, and also feeds the boiling chamber, with the same fuel saving results, mentioned above.

The distilled water leaves the primary condenser through the opening of pipe 22 in the base 3, unites with the distilled water from the tube 20 in the secondary condenser 21, and the entire quantity of the distilled water passes through the pipe 22, on its way to the distilled water storage.

Excess vapor and gases, not condensed fully in the primary condenser, pass through the disk and dome center channel 9', through a small hole 17, into a vertical pipe 18 to which is connected the pipe 20 of the secondary condenser, to carry the condensed vapor for the purpose of completing the condensation in the secondary condenser 21. The pipe 18 is provided with a closed extension, having a smaller hole 19 in its closed end which acts as an exit for for any non-condensible gases.

Additional features of the invention consist of providing a noise proof cushion 11 to the overflow drain pipe 12; and providing perforated discs 25 to cover the top and bottom of each coil to provide rigidity, greater lasting properties, and to increase the condensing surface areas.

The electrical heating system can be replaced with any other heating system, such as gas, oil, etc., without affecting the general design of the apparatus. Similarly, various other features may be added to the condensing units, such as replacing the piping with corrugated pipe, or adding fins to the exterior of the coolant tubes.

The predetermined level 6 of the supply water in the lower compartment "X", must be maintained at all times, so that such water does not interfere with proper operation of the distillation process. This is taken care of by the drain pipe 12.

The opening 9' is partly enclosed with a curved wall, referred to by the same reference number. This wall is semi-circular in cross-section. The condenser tubing coils are welded to this wall for support.

Having described my invention what I claim is:

1. A water-distillation apparatus built of non-corrosive materials and comprising, in combination, an enclosed, generally cylindrical container, a divider plate in an intermediate potion of said container dividing said container into an upper chamber and a lower chamber, an upright tube in said lower chamber and communicating with a central portion of said upper chamber, heating means within said upright tube, a perforated container positioned at the top of said upright tube and containing balls for separating boiling water and vaporized water so that the boiling water can be returned to said upright tube, a plurality of coiled tubes in spaced, generally horizontal planes in said upper chamber, means forming a condenser chamber located outside said cylindrical container, a centrally-located tube in said upper chamber extending through said plurality of coils, a first outlet pipe communicating with the upper end of said central tube and extending through said condenser chamber, a second outlet pipe communicating with the lower end of said upper chamber and with said first outlet pipe, a return pipe communicating with the uppermost one of said coiled tubes and with the lower end of said upright tube for supplying heated water from said coiled tubes to said upright tube, a supply water pipe for supplying water to be distilled to said condenser chamber around said first outlet pipe and for supplying water to be distilled to the lowermost one of said coiled tubes in said upper chamber, whereby water is supplied to said upright tube through said condenser chamber and through said coiled tubes.

2. A water-distillation apparatus according to claim 1 characterized by means forming an additional chamber around said upright tube, and passage means communicating with the lower end of said additional chamber and with said upright tube for supplying condensate from said additional chamber to said upright tube.

3. A water-distillation apparatus according to claim 1 characterized by some of said coiled tubes being of dome-shaped configuration.

* * * * *